United States Patent [19]

French

[11] Patent Number: 4,752,114
[45] Date of Patent: Jun. 21, 1988

[54] DECORATIVE COVERING INCLUDING PILE FABRIC AND CO-TERMINOUS OPTICAL FIBER CABLES

[76] Inventor: Stephen French, 4 Johnston's Lane, Dundee DD1 5ET, Scotland

[21] Appl. No.: 816,205

[22] Filed: Jan. 6, 1986

[51] Int. Cl.⁴ .......................... G02B 6/04; F21V 7/04; B32B 3/02
[52] U.S. Cl. .............. 350/96.24; 350/96.10; 350/96.25; 362/32; 362/153; 428/95; 428/97
[58] Field of Search ............. 350/96.10, 96.20, 96.22, 350/96.24, 95.25, 96.23; 362/32, 153; 428/85, 95, 97, 187

[56] References Cited

U.S. PATENT DOCUMENTS

| | | | |
|---|---|---|---|
| 3,881,976 | 5/1976 | Jones | 350/96.24 X |
| 4,034,215 | 7/1977 | Hashimoto | 362/32 X |
| 4,234,907 | 11/1980 | Daniel | 362/32 |
| 4,329,739 | 5/1982 | Loebner | 362/153 |
| 4,340,929 | 7/1982 | Konikoff et al. | 362/153 |
| 4,422,719 | 12/1983 | Orcutt | 350/96.30 |
| 4,521,205 | 6/1985 | Spector | 446/302 |
| 4,670,317 | 6/1987 | Greenway | 428/187 X |
| 4,702,546 | 10/1987 | Mori | 350/96.10 |

FOREIGN PATENT DOCUMENTS

| | | | |
|---|---|---|---|
| 0155157 | 9/1985 | European Pat. Off. | 350/96.24 |
| 1388073 | 3/1975 | United Kingdom | 350/96.24 |
| 2120398 | 11/1983 | United Kingdom | 350/96.24 |

Primary Examiner—William L. Sikes
Assistant Examiner—Brian M. Healy
Attorney, Agent, or Firm—Ratner & Prestia

[57] ABSTRACT

A decorative covering in the form of a carpet (1) has threaded through it a number of fibre optic cables (2) the ends of each extend to the same height as the carpet pile (4). The individual cables (2) are gathered into bundles (5) which extend to a light source (6) such that the fibre optic cables (2) are supplied with light from the light source (6). Between the light source (6) and the bundles (5) various colored filters (9) may be provided so that the fibre optical cables (2) may be selectively supplied with different colored light. The light source (6) may be controlled by an audio system so that the light source (6) is actuated in response to selected audio tones.

6 Claims, 1 Drawing Sheet

DECORATIVE COVERING INCLUDING PILE FABRIC AND CO-TERMINOUS OPTICAL FIBER CABLES

BACKGROUND OF THE INVENTION

This invention relates to a decorative covering.

In discotheques and other public places it has become popular to provide flashing lights which may be controlled by stroboscopic apparatus or by audio equipment which actuates predetermined sequences of lights in response to audio tones emitted by the equipment. Such displays are generally in the form of upright screens having light bulbs arranged in them. It has also been proposed to provide recesses in the floor with light bulbs in the recesses, the bulbs being wired to a power source which causes selective actuation of sequences of bulbs.

BRIEF SUMMARY OF THE INVENTION

According to the present invention there is provided a decorative covering characterised in that outwardly-facing fibre optic cable terminals are provided, the fibre optic cables extending from at least one light source wherein more than one terminal is supplied with light from one light source.

Preferably the covering is a carpet and the fibre optic cable terminals project through the carpet pile and are co-terminous with the fibres of the pile; in this way the terminals are clearly visible when lit up but do not project beyond the pile so as to be subject to damage. The use of a carpet also allows the fibre optic cables to extend in a curve through the backing of the carpet thereby preventing cracking or other damage being caused to the cables. The cables are also cushioned by the carpet pile as they run along the underside of the backing to the light source, so that they are not damaged by the weight of people walking on the carpet.

The covering may be of other types such as continuous vinyl flooring or wooden floorboards, but a carpet has been found especially effective and practical.

The fibre optic cable terminals may be disposed at random or may be set in predetermined patterns. The cables may be run as bundles to a common light source or to a number of light sources. In the latter case the light sources may be connected to an audio system so that each light source is actuated in response to a corresponding audio tone; this is especially effective in, for example, discotheques and dance halls.

Colour may be provided at the terminals by arranging one or more colour filters between the light source and the cable. A number of filters may be provided, and these may be arranged for sequential exposure to the light so as to give a display of changing colours at the terminals; for example when a number of light sources are provided these may be arranged in combination with a rotating disc which carries a variety of colour filters, so that the effect on the covering is of differently-coloured lights moving across the floor.

Such sequential control of lights and colours can be controlled by microprocessor.

BRIEF DESCRIPTION OF THE DRAWINGS

An embodiment of this invention will now be described by way of example with reference to the accompanying drawing, in which.

DETAILED DESCRIPTION

Figure 1:
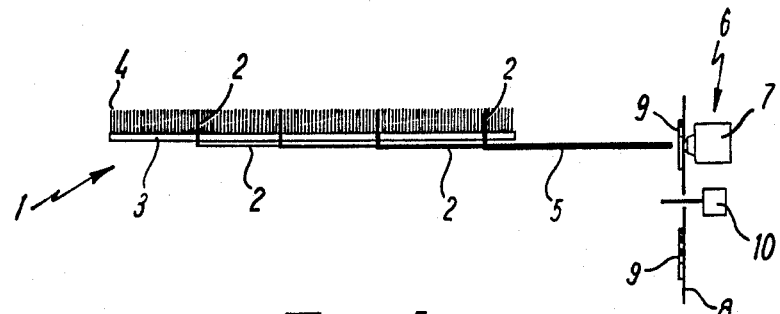
FIG. 1 is a schematic diagram of a lighting system for a decorative covering of the invention.

In this embodiment of the invention a covering in the form of a carpet 1 has threaded through it a number of CROFON fibre optic cables 2 each 0.010 inch in diameter. The cables 2 are applied to the carpet 1 by threading them through the carpet's fabric backing 3 and pile 4 until they stand proud of the pile 4, securing them to the backing 3 with adhesive tape or other means and then cutting their ends so that they extend only as high as the pile 4, as shown in FIG. 1 of the drawings.

Figure 2:
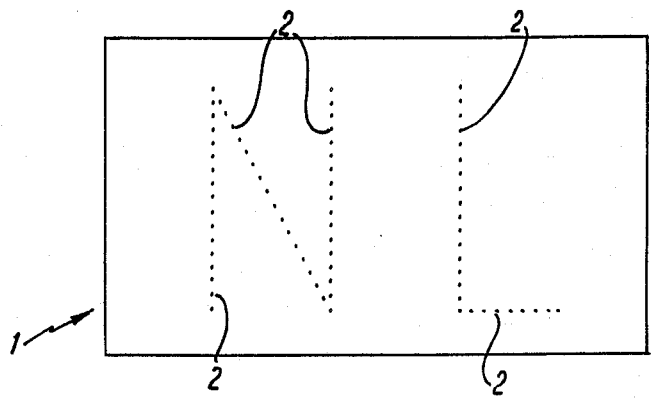
FIG. 2 is a plan view of the covering of FIG. 1.

Various numbers of the cables 2 are bundled together, for example into two bundles 5 as in FIG. 2 forming the letters "N" and "L" respectively. Each bundle 5 is then led under the carpet 1 to a respective light source indicated generally at 6 in FIG. 1, in which only one of the bundles 5 and sources 6 is illustrated.

The source 6 has a mains-powered lamp 7 whose outlet is a small aperture corresponding in size generally to the overall size of the end face of the bundle 5 so that the light produced in the lamp 7 is concentrated on the cables 2. Between the lamp 7 and the bundle 5 is a rotatable disc 8 having at intervals around its face translucent colour filters 9 and blank non-translucent areas. The disc 8 is driven by an electric motor 10 also powered by mains electricity.

In use, the lamp 7 is switched on and the disc 8 rotated. Light from the lamp 7 passes through the filters 9 and emerges coloured. The coloured light passes along the bundle 5 of fibre optic cables 2 and appears at the cable terminals among the pile 4 of the carpet 1, creating a coloured pattern as represented by the "N" in FIG. 2. As the disc 8 rotates another coloured filter 9 comes before the lamp 7, with the result that the colour of the "N" on the carpet 1 changes. Further rotation creates other colours and non-illumination alternately, the non-illumination occurring when the non-translucent areas of the disc 8 are adjacent the lamp.

Similarly the pattern represented by the "L" in FIG. 2, connected to a separate light source 6, changes colour independently of the "N".

The bundles 5 may be formed from alternate cables 2 from each pattern "N" and "L", so that the patterns change colour in similar fashion. Alternatively the cables 2 can be disposed with their end faces arranged around the disc 8 so that each pattern on the carpet is gradually changing colour along its length. This can best be achieved by a large outlet, or aperture, of the lamp 7 providing light through a number of colour filters 6 simultaneously.

Other modifications and improvements can be made without departing from the scope of the invention.

I claim:

1. A decorative covering comprising a pile fabric having a backing and a pile, said pile having a first end portion affixed to said backing and extending to a second end portion remote from said backing; a plurality of fibre optic cables upstanding from the backing and having first end portions co-terminous with the second end portion of said pile and extending through the backing to second end portions of the cables exposed to a light source.

2. A decorative covering as claimed in claim 1 wherein the fibre optic cables have their first end portions set in a predetermined pattern.

3. A decorative covering as claimed in claim 1, wherein the fibre optic cables are run as bundles to a number of light sources.

4. A decorative covering as claimed in claim 1 wherein the light source is controlled by a microprocessor.

5. A decorative covering as claimed in claim 1, wherein a plurality of coloured filters are provided between the second end portions of the fibre optic cables and said light source, said filters being arranged for sequential exposure to the light source.

6. A decorative covering as claimed in claim 5, wherein a controller is provided for activating said light source and said coloured filters in response to an audio input signal.

* * * * *